Feb. 20, 1968   J. CLAYTON, JR   3,369,410
BUSHING STOP MECHANISM
Filed Feb. 24, 1966
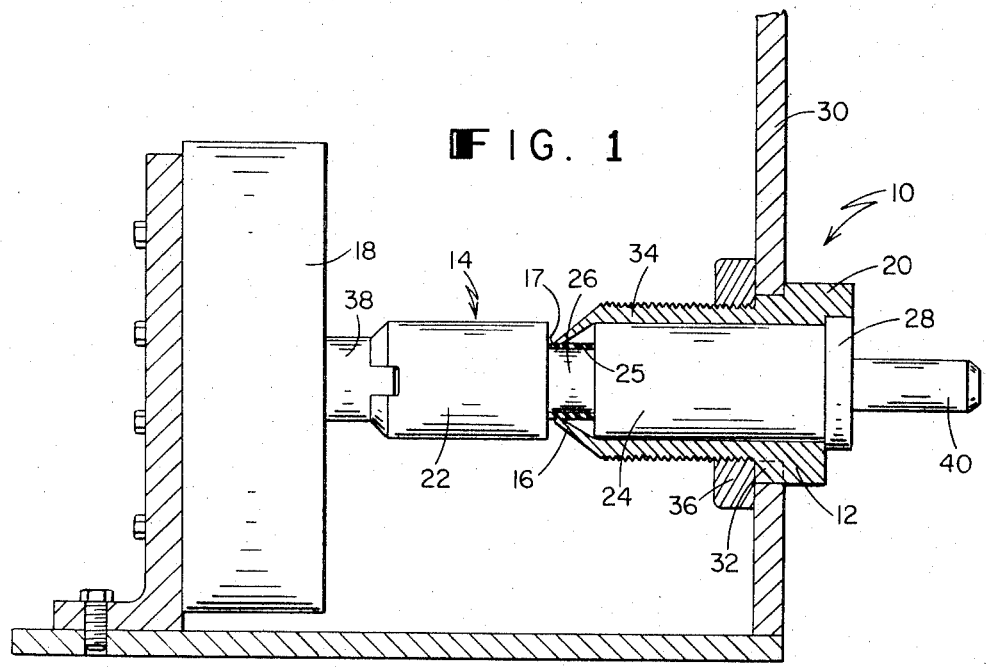
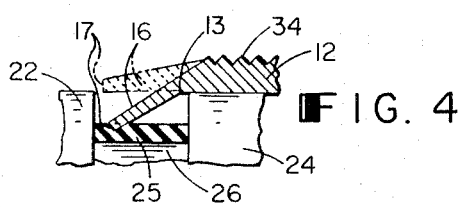
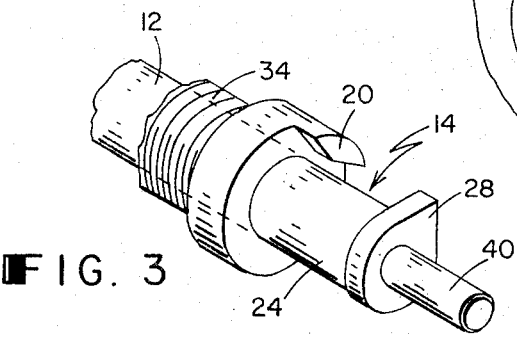
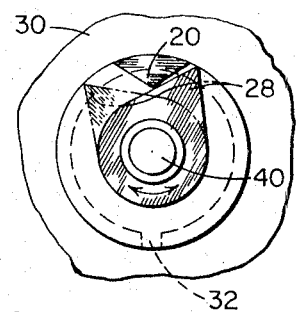

United States Patent Office 3,369,410
Patented Feb. 20, 1968

3,369,410
BUSHING STOP MECHANISM
John Clayton, Jr., Stow, Mass., assignor to Waters Manufacturing, Inc., Wayland, Mass., a corporation of Massachusetts
Filed Feb. 24, 1966, Ser. No. 529,807
8 Claims. (Cl. 74—10.2)

This invention relates to rotary adjustable controls and more particularly, to rotary shaft and bushing assemblies of the type used, for example, with electronic potentiometers, switches and the like.

The use of rotary adjustable controls, particularly in the electronic and related industries, has increased markedly in recent years. Although these controls vary in their size and function, they share one common characteristic—they are adjusted by a shaft extending axially through, and mounted for rotation relative to a fixed bushing. Frequently, a system of stops is provided predeterminedly to fix the limits of rotation of the shaft. The bushing and shaft assembly must then provide for smooth rotation of the shaft between the fixed limits while simultaneously preventing axial movement of the shaft relative to the bushing.

It is a primary object of the present invention to provide a shaft and bushing assembly which accomplishes all the required functions and, at the same time is comprised of the minimum possible number of parts, as the cost of the shaft and bushing assembly may be a major portion of the cost of the entire electronic control. Other objects include providing an assembly which may be quickly and economically assembled from individually inexpensive components.

Generally, the present invention accomplishes these and other objects by providing a bushing and shaft assembly comprising only two component parts, each of which may be inexpensively manufactured by conventional screwmaking machines or similar apparatus. The first component, the shaft element, has a cylindrical body portion with a peripheral groove therein, preferably having a resilient bottom surface. The second component, the bushing element, comprises a cylindrical bearing, one end portion of which is deformable and for that purpose preferably has a thinner wall thickness than the remaining portions of the bearing. The shaft element is mounted coaxially within the bearing element for rotation relative to the bearing element. For assembly, the deformable wall portion of the bearing element is swagged inwardly so that its free end is located within the groove preferably in contact with its resilient bottom but spaced from the walls thereof for free but braked rotation of the shaft in the bearing element. The free end thus has a diameter less than the body portions of the shaft and so prevents more than a slight axial movement of the shaft relative to the bushing in at least one direction. In preferred embodiments, the shaft and bearing elements each include integral stop means for limiting the rotation of the shaft relative to the bushing to the desired number of degrees.

Other objects, advantages, and features will appear from the following detailed description of a preferred embodiment, taken with the attached drawing thereof, in which:

FIG. 1 is a plan view, partially in section, of a panel mounted bushing and shaft assembly embodying the present invention;

FIG. 2 is a plan view illustrating a portion of the assembly of FIG. 1 in greater detail;

FIG. 3 is an exploded perspective view of components of the assembly of FIG. 1; and FIG. 4 is an enlarged view of a portion of the assembly of FIG. 1.

Referring more particularly to the drawing, there is illustrated a shaft and bushing assembly, generally designated 10, constructed according to the present invention and comprising a bushing or bearing element 12 supporting a substantially cylindrical shaft element 14. Bushing element 12 comprises a conventional cylindrical bearing, one end of which has been machined to provide a deformable, relatively thin walled cylindrical swaging portion 16.

When assembly 10 is used in conjunction with a control device, such as the potentiometer 18 illustrated in FIG. 1, whose rotational adjustment must be limited to less than 360°, an integral V shaped stop 20 having side surfaces of substantial axial extent meeting at an apex is provided on bushing element 12 preferably on the axial end most distant from swaging portion 16.

Shaft element 14 comprises a pair of axially-spaced cylindrical body portions 22 and 24 connected by a groove in the form of a cylindrical, coaxial intermediate portion 26 whose diameter is substantially less than the diameters of body portions 22 and 24. If the shaft element is of metal, as is preferred, a resilient sleeve 25 is positioned around the bottom surface of groove 26. Such sleeve may be of a suitably resilient plastic material such as polytetrafluoroethylene, polypropylene, or the like.

As illustrated, a V shaped stop 28 having side surfaces of substantial axial extent meeting at an apex is provided extending transversely outwardly from an end of body portion 24 for engaging stop 20 on bushing element 12 to limit the rotation of the shaft relative to the bushing. Although the exact size and configuration of stops 20 and 28 depends on the number of degrees to which the rotation of shaft element 14 is to be limited, it is a feature of the present invention that they are integral with their respective elements and that their mutually contacting surfaces are relatively flat and parallel to one another on contact to provide contacting surfaces of substantial extent for minimum wear which would produce errors in the angle of rotation between stop positions.

As shown in FIGS. 1 and 3, shaft element 14 is mounted coaxially within bushing element 12. The outside diameter of body portion 24 of the shaft element is slightly less than the inside diameter of the bushing element to insure the desired easy rotation of the shaft relative to the bushing.

The deformable end portion 16 of bushing element 12 prevents shaft element 14 from moving substantially axially relative to the bushing element. As initially manufactured, deformable end portion 16 had the substantially cylindrical configuration indicated by the dashed lines in FIG. 4. With the deformable end portion in this position, shaft element 14 was axially inserted into bushing element 12. After the shaft element was in place, portion 16 was inwardly deformed to swage it into the position shown by the solid lines in which its free end portion, designated 17, has a diameter less than the diameter of either of the body portions of shaft element 14 and engages sleeve 25 surrounding the intermediate portion 26 of shaft element 14 for relative rotation thereof as braked to a suitable degree by contact with the sleeve. Preferably, free rotation is assured by reason of an overhung portion 13 of bushing 12 beyond the end of shaft portion 24, so that the deformable end portion 16 is spaced within the walls of shaft portion 26 forming the groove and so its free end portion 17 remains in uniform sliding contact with the resilient surface of sleeve 25.

The end portions of shaft element 14 and the exterior peripheral surface of bushing element 12 may be finished as required for adopting the complete assembly for its intended use. When, as shown in FIG. 1, shaft and bushing assembly 10 is mounted on a panel 30, a keyway 32 for preventing the assembly from rotating relative to the panel, and threaded portion 34 for receiving a locknut 36, are provided on the peripheral surface of bearing element 12. The end of body portion 22 of shaft element 14 is chamfered and sloted for coupling assembly 10 to the shaft 38 of potentiometer 18. The other end of shaft 14, spaced axially beyond stop 28 and body portion 24, includes a reduced diameter cylindrical projection 40 for mounting an adjusting knob, dial, or the like.

It will of course be understood by those skilled in the art that various changes may be made in the construction and arrangement of parts without departing from the spirit of the invention as set forth in the following claims.

I claim:

1. A rotary adjustable shaft and bushing assembly comprising, in combination:
  a substantially cylindrical bushing element; and
  a substantially cylindrical shaft element mounted coaxially within for rotation relative to said bushing element,
  said shaft element having a body portion with a peripheral groove of reduced diameter therein and
  said bushing element including an inwardly deformed end portion having a diameter less than the diameter of said body portion of said shaft element and located within said groove spaced from the walls thereof for preventing substantial axial movement of said shaft element relative to said bushing element in at least one direction.

2. The assembly of claim 1 wherein said groove has a resilient plastic bottom wall with said end portion in running contact therewith.

3. The assembly of claim 1 in which said shaft and bushing elements include stop means for limiting the rotation of said shaft element relative to said bushing element.

4. The assembly of claim 3 in which said stop elements are integral with their respective shaft and bushing elements.

5. A rotary adjustable shaft and bushing assembly comprising, in combination:
  a substantially cylindrical bushing element; and
  a substantially cylindrical shaft element mounted coaxially within for rotation relative to said bushing element,
  said shaft element comprising first and second coaxial, axially-spaced body portions secured to a cylindrical intermediate portion having a smaller diameter than either of said body portions, and
  said bushing element including an inwardly deformed end portion having a diameter less than the diameter of either of said body portions of said shaft element located within said intermediate portion of said shaft element and spaced from the wall thereof for preventing substantial axial movement of said shaft element relative to said bushing element.

6. The assembly of claim 5 in which said shaft element has an end portion of greater diameter than that of said body portion for preventing substantial axial movement of said shaft element relative to said bushing element in a direction opposite to said one direction.

7. The assembly of claim 6 in which said shaft and bushing elements each include integral stop means for limiting the rotation of said shaft element relative to said bushing element,
  said stop means each being of V shape with their mutually contacting surfaces relatively flat and parallel to one another on contact.

8. A rotary adjustable shaft and bushing assembly comprising, in combination:
  a substantially cylindrical bushing element; and
  a substantially cylindrical shaft element mounted coaxially within for rotation relative to said bushing element,
  said shaft element comprising first and second coaxial, axially-spaced body portions having therebetween a cylindrical resilient plastic intermediate surface portion having a smaller diameter than either of said body portions, and
  said bushing element including an inwardly deformed end portion having a diameter less than the diameter of either of said body portions of said shaft element located within and in running contact with said intermediate portion of said shaft element and spaced from the walls thereof for preventing substantial axial movement of said shaft element relative to said bushing element,
  said shaft and bushing elements each including integral stop means for limiting the rotation of said shaft element relative to said bushing element,
  said stop means each being of V shape with their mutually contacting surfaces relatively flat and parallel to one another on contact.

References Cited
UNITED STATES PATENTS 1,519,166 12/1924 Rauch.
3,107,546 10/1963 Rowland.

MILTON KAUFMAN, *Primary Examiner.*